US012782552B2

(12) United States Patent
Meyer et al.

(10) Patent No.: US 12,782,552 B2
(45) Date of Patent: Nov. 3, 2026

(54) ADJUSTING RADAR PARAMETER SETTINGS BASED UPON DATA GENERATED IN A SIMULATION ENVIRONMENT

(71) Applicant: GM Cruise Holdings LLC, San Francisco, CA (US)

(72) Inventors: Michael Meyer, Munich (DE); Georg Kuschk, Garmisch-Partenkirchen (DE)

(73) Assignee: GM Cruise Holdings LLC, San Francisco, CA (US)

( * ) Notice: Subject to any disclaimer, the term of this patent is extended or adjusted under 35 U.S.C. 154(b) by 430 days.

(21) Appl. No.: 17/565,999

(22) Filed: Dec. 30, 2021

(65) Prior Publication Data

US 2023/0204760 A1 Jun. 29, 2023

(30) Foreign Application Priority Data

Dec. 23, 2021 (EP) .................................... 21217633

(51) Int. Cl.
*G01S 13/931* (2020.01)
*G01S 7/40* (2006.01)

(52) U.S. Cl.
CPC .......... *G01S 13/931* (2013.01); *G01S 7/4052* (2013.01)

(58) Field of Classification Search
None
See application file for complete search history.

(56) References Cited

U.S. PATENT DOCUMENTS 11,151,447 B1 * 10/2021 Chen ..................... G01S 7/4091
2019/0178988 A1 * 6/2019 Englard ............ G06F 18/24143
2020/0319325 A1 * 10/2020 Kong .................... G01S 7/4021
2021/0018590 A1 * 1/2021 Grau ............... B60W 60/00186
2021/0286923 A1 * 9/2021 Kristensen ............. G01S 7/412

FOREIGN PATENT DOCUMENTS

EP 4202493 A1 6/2023

OTHER PUBLICATIONS

"Response to the Extended European Search Report for European Patent Application No. 21217633.3", Filed Date: Jan. 16, 2024, 15 pages.
"Extended European Search Report for European Patent Application No. 21217633.3", Mailed Date: Jun. 21, 2022, 9 pages.

* cited by examiner

*Primary Examiner* — Resha Desai
*Assistant Examiner* — Brandon James Henson
(74) *Attorney, Agent, or Firm* — Honigman LLP; Matthew H. Szalach

(57) ABSTRACT

Various technologies relating to a system that uses a computer-implemented model to determine optimal radar parameter settings based on the situational and environmental context of an autonomous vehicle (AV) to improve driving outcomes of the AV. Simulated sensor data corresponding to different radar parameter settings can be generated in simulation, and the computer-implemented model can be trained based on the respective sets of simulated sensor data. A radar system of an AV can be modified to operate using a radar parameter setting identified by the computer-implemented model, where the radar parameter setting is outputted by the computer-implemented model responsive to a state identified from sensor data being inputted to the computer-implemented model. The AV can use the output of the computer-implemented model to select the optimal radar parameter settings to implement.

13 Claims, 6 Drawing Sheets

ADJUSTING RADAR PARAMETER SETTINGS BASED UPON DATA GENERATED IN A SIMULATION ENVIRONMENT

RELATED APPLICATION

This application claims priority to European Patent Application No. EP 21217633.3, filed on Dec. 23, 2021, and entitled "ADJUSTING RADAR PARAMETER SETTINGS BASED UPON DATA GENERATED IN A SIMULATION ENVIRONMENT" the entirety of which is incorporated herein by reference.

BACKGROUND

In connection with navigating an environment, an autonomous vehicle (AV) perceives objects surrounding the AV based upon sensor signals generated by sensor systems of the AV. For example, the AV may include a camera system, a lidar system, a radar system, etc., where a computing system of the AV receives data based upon sensor signals generated by such sensor systems and performs a variety of different perception subtasks, such as freespace detection, scene classification, and detection and tracking of other vehicles and pedestrians.

Conventionally, radar systems are configured to construct at least one of a three-dimensional point cloud, two dimensional point cloud or dense radar tensor, and transmit the data to the computing system of the AV. The computing system of the AV executes computer-implemented instructions based upon the three-dimensional point cloud in connection with performing a perception subtask to be utilized for autonomous navigation (such as one or more of the perception subtasks referenced above). In an example, the computing system of the AV can include a perception system that uses a computer-implemented model, such as a deep neural network (DNN), where the three-dimensional point cloud generated by the radar system is provided as input to the computer-implemented model, and the computer-implemented model generates output based upon the three-dimensional point cloud. The perception system can assign a label to an object (such as a pedestrian or other vehicle) represented in the three-dimensional point cloud based upon the output of the computer-implemented model.

While the output of the computer-implemented model used by the perception system can be improved over time via a training process, performance of the perception system is dependent on the three-dimensional point cloud generated from the sensor data, which is itself dependent on radar parameter settings selected for the radar system. Examples of the radar parameter settings can include amplitude, signal waveform, beamsteering settings, phase offsets, and so forth. Traditional radar systems transmit substantially similar radar waveform patterns over time, and thus, enable sampling the environment using the substantially similar patterns transmitted at differing times. However, for instance, in a given scenario, the radar system may operate using particular radar parameter settings that lead to insufficient radar data for a relevant portion of an environment nearby the autonomous vehicle being collected by the radar system (e.g., the radar data returned from a particular portion of the environment where pedestrians are commonly located in a given scenario can be sparse). Thus, operation of an AV in various scenarios can be detrimentally impacted by using static radar parameter settings for the radar system of the AV.

SUMMARY

The following is a brief summary of subject matter that is described in greater detail herein. This summary is not intended to be limiting as to scope of the claims.

Various technologies herein relate to a system that trains a computer-implemented model to determine optimal radar parameter settings based on the situational and environmental context of an autonomous vehicle (AV) to improve driving outcomes of the AV. The system can generate simulated sensor data associated with the different radar parameter settings when simulating driving in a virtual driving simulation system. The simulated sensor data corresponding to the different radar parameter settings can be inputted to a perception system. Moreover, performance of the simulated AV can be analyzed based on outputs of the perception system. Reinforcement learning can be employed to learn an action, namely, how to adjust radar parameter settings depending on the environment. Thus, simulated AV autonomous driving performance can be scored to determine which radar parameter settings are associated with the highest scores. Accordingly, a computer-implemented model can be trained based on simulation sensor data that satisfies a goal function generated from virtual driving simulation in a virtual environment. An AV can then use the computer-implemented model to determine the situational and environmental context of the AV and select the optimal radar parameter settings to implement for autonomous operation.

Moreover, a computing system of an AV can be configured to identify an appropriate or optimal radar parameter setting to use in an AV based radar system based on output of the computer-implemented model and sensor data received by the radar system. First sensor data generated by the radar system of the AV can be received. Moreover, a state associated with the first sensor data can be identified. The radar system can be modified to operate using a radar parameter setting identified by the computer-implemented model. The radar parameter setting can be outputted by the computer-implemented model responsive to the state being inputted to the computer-implemented model, Moreover, the computer-implemented model is trained based on simulation sensor data that satisfies a goal function generated from virtual driving simulation in a virtual environment. Second data generated by the radar system of the AV can be received when the radar system is operating using the radar parameter setting identified by the computer-implemented model. Moreover, the AV can be controlled to perform a driving maneuver based on the second data generated by the radar system when the radar system is operating using the radar parameter setting. Thus, the computer-implemented model can be used to identify the radar parameter settings associated with situational and contextual factors of the simulated sensor data that lead to enhance performance of a perception system. Based on real-time sensor data of a radar system on the AV, the system can determine what the current state of the AV is, (e.g., what the environmental and situational contexts are) and then select the optimal radar parameter settings for that state.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
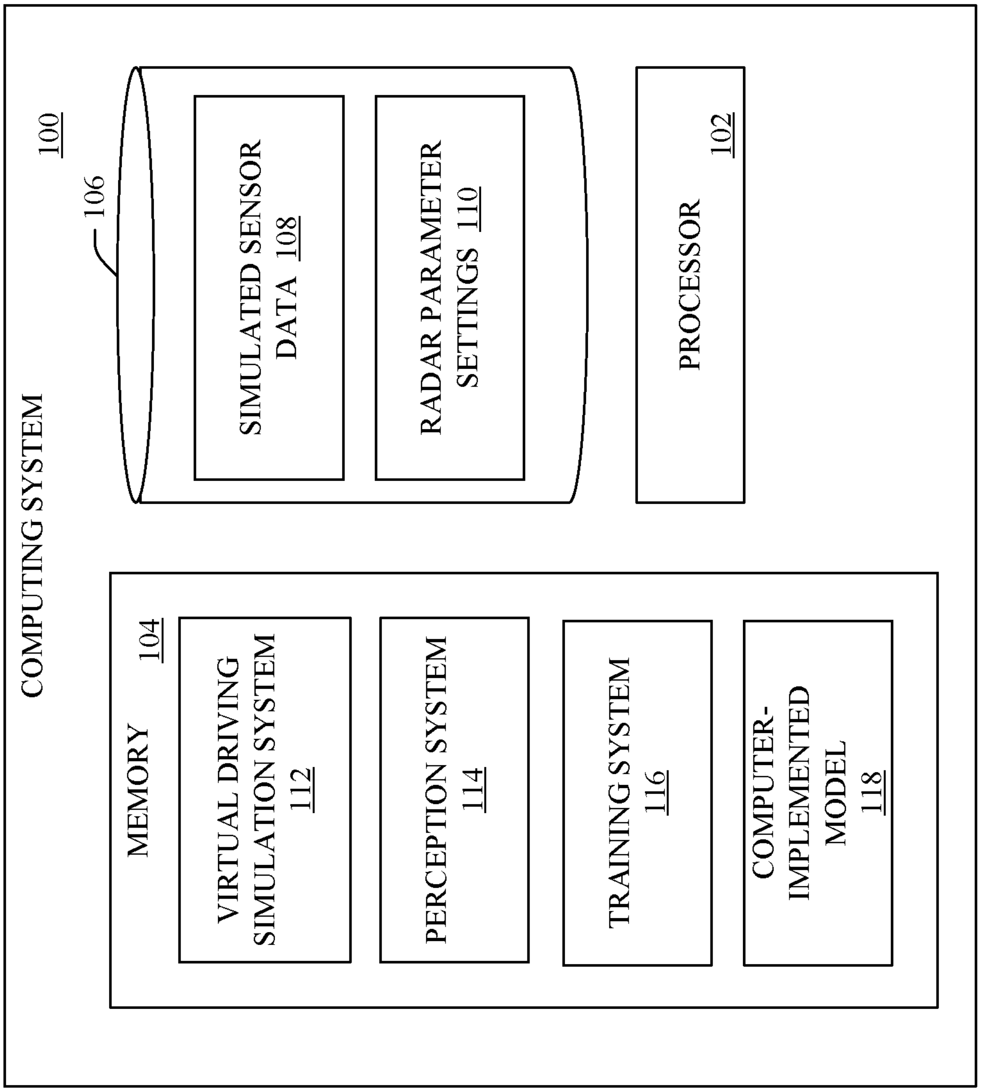
FIG. 1 is a functional block diagram of a computing system that is configured to train a computer-implemented model for determining optimal radar parameters for use in an autonomous vehicle (AV).

Various technologies pertaining to simulating and processing sensor data in an autonomous vehicle (AV) are now described with reference to the drawings, where like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system modules may be performed by multiple modules. Similarly, for instance, a module may be configured to perform functionality that is described as being carried out by multiple modules.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Described herein are various technologies pertaining to training a cognitive radar system through reinforcement learning in simulation. Disclosed herein is a system that can optimize radar parameter settings of a radar system on an AV based on a state (e.g., a state of the AV, a state of the environment, a state detected from sensor data received by the radar system) in order to improve the performance and improve the safety of the AV. In contrast to conventional approaches, the radar parameter settings of the radar system can change over time based on the state. Thus, a waveform pattern for the radar system can be adapted based on sensor data generated by the radar system during a given measurement, where the adapted waveform pattern can be used for a subsequent measurement by the radar system.

Traditionally, a perception system is trained and installed in an AV, and the AV can use the perception system to facilitate driving operations. Sensor data can be inputted to the perception system to perform various perception subtasks, such as detection, classification, and tracking of objects in vicinity of the AV. The perception system, for instance, can be or include a deep neural network (DNN). The sensor data inputted to the perception system can be generated by various types of sensor systems (e.g., a radar system, a lidar system, a camera system, etc.). Parameter settings of a sensor system can thus impact performance of the perception system of the AV. For instance, if an object nearby the AV is not seen in sensor data returned by a sensor system due to parameter settings utilized by the sensor system, then performance of the perception system can be detrimentally impacted. By way of example, radar parameter settings utilized by the radar system can impact an ability of the perception system to perform a perception subtask. Examples of the radar parameter settings include amplitude, frequency, beamforming settings, phase offsets, signal waveforms and other related parameters. Conventionally, radar parameter settings employed by a radar system of an AV are static over time; thus, radar waveform patterns sent out by such a conventional radar system often are substantially similar, and hence, sampling of the environment can be in a substantially similar pattern.

In contrast, disclosed herein is the additional feature of determining which radar parameter setting is optimal to provide a further improvement on the safety and performance of the AV. To that end, a driving operations can be simulated based on output of perception system, and performance of the output of the perception system can be evaluated to learn how to adjust sensor parameters depending on the environment. The performance of the perception system using simulated sensor data generated using different radar parameter settings can be analyzed to identify radar parameter settings that perform well in various states.

Reinforcement learning can be used to train a computer-implemented model based on the performance of the perception system using the simulated sensor data generated using the different radar parameter settings. Thus, the performance of an AV can be simulated, and the respective radar parameter settings can be scored by how well the AV detects objects and avoids safety events. Using reinforcement learning, the computer-implemented model can then determine which radar parameter settings lead to optimal outcomes for a given state (e.g., environmental factors, types of objects around the AV, location of the AV, etc.).

The computer-implemented model can be executed by a computing system on the AV. A current state can be identified based on current sensor data from the radar system of the AV. The state can be inputted to the computer-implemented model, which can output optimal radar parameter settings or combination of settings. The radar system on the AV can be modified to implement the optimal radar parameter settings, and the AV can perform one or more driving maneuvers based on subsequent sensor data received from the radar system on the AV.

Once the computer-implemented model is trained, the computer-implemented model can be instantiated on a computing system on an AV. The perception system can be used by the AV to perform an autonomous navigation perception subtask (such as object detection, classification, and/or tracking) using the sensor data generated by the sensor system of the AV. The computing system can control the AV to perform a driving maneuver based upon the perception subtask performed by the computer-implemented model. For example, the output of the computer-implemented model may indicate the existence of a particular type of object in proximity to the AV (as well as velocity of such object relative to the AV), such as a pedestrian, a bicyclist, another vehicle, etc. The driving maneuver can be a braking of the AV, a swerve, acceleration, deceleration, or other suitable driving maneuver.

While many of the examples of the techniques set forth herein pertain to use of the computer-implemented model on a computing system of an AV, it is to be appreciated that these techniques can be implemented for sensors on AVs as well as vehicles with advanced driver assistance systems (ADAS). For instance, a computing system on a non-AV (e.g., a vehicle with ADAS) can utilize the computer-implemented model described herein; thus, the techniques described herein can be extended to such a non-AV scenario.

Referring now to FIG. 1, a computing system 100 configured to train a computer-implemented model 118 for determining optimal radar parameter settings 110 for use in an autonomous vehicle (AV) is illustrated. The computer-implemented model 118 can be trained through reinforcement learning in simulation.

The computing system 100 includes a processor 102 and memory 104, where the memory 104 includes instructions that are executed by the processor 102. The computing system 100 also includes a data store 106 that includes data that can be retrieved from the data store 106 and placed into the memory 104. More specifically, the data store 106 includes simulated sensor data 108 and radar parameter settings 110. The simulated sensor data 108 is simulated sensor data that corresponds to what a radar system would receive and process with different radar parameter settings 110 given a current state.

The memory 104 includes a virtual driving simulation system 112, a perception system 114, a training system 116, and a computer-implemented model 118. The virtual driving simulation system 112 can simulate driving of a simulated autonomous vehicle in a virtual environment. Simulated sensor data 108 can be obtained by the computing system 100 in response to simulating the driving of the simulated autonomous vehicle in the virtual environment. For instance, the simulated sensor data 108 can be simulated radar data generated by a radar system of the simulated autonomous vehicle operating in the virtual environment. However, the approaches described herein can likewise be extended to other types of simulated sensor data (and sensor systems) (e.g., simulated camera data generated by a camera sensor system of the simulated autonomous vehicle operating in the virtual environment, simulated lidar data generated by a lidar sensor system of the simulated autonomous vehicle operating in the virtual environment). Simulated environmental data can also be obtained by the computing system 100 in response to simulating the driving of the simulated autonomous vehicle in the virtual environment performed by the virtual driving simulation system 112.

The simulated sensor data 108 can be inputted to a perception system 114. The perception system 114 can perform one or more perception subtasks related to autonomous navigation, such as object detection, object classification, object tracking, etc. based on the simulated sensor data 108 corresponding to respective radar parameter settings 110.

Performance of the perception system 114 based on the simulated sensor data 108 can be analyzed to learn how to adjust the radar parameter settings 110 depending on the environment. Accordingly, output of the perception system 114 can be used by the virtual driving simulation system 112 to perform simulated driving maneuvers based on the object classification, detection and tracking data. Further, outcomes of the driving maneuvers can be scored based on the safety and performance of the driving maneuvers (e.g., were there any collisions or other safety events, navigation accuracy, etc.). Simulation data that satisfies a goal function generated from virtual driving simulation in the virtual environment can be identified. A goal function, for example, can define which objects in which areas nearby an AV should be detected by a radar system in a given state. Using reinforcement learning, the training system 116 can train the computer-implemented model 118 to identify the radar parameter settings 110 or combinations thereof that score the highest or above a predefined threshold for respective states (e.g. environmental context, types of objects, location of AV, location of objects, etc.). The scores can be ranked according to the goal function that defines to what the scores are associated.

The simulated sensor data 108 can include simulated sensor data for both different combinations of radar parameter settings 110 and states. For example, in a first state, an object can be located at a first distance and location relative to the AV, the simulated sensor data 108 can include sensor data corresponding to a variety of radar parameter settings 110 in that first state. In a second state, for a different object at a different location, the simulated sensor data 108 can also include sensor data corresponding to a variety of radar parameter settings 110. The simulated sensor data 108 can include simulated sensor data for a large number of states and radar parameters settings 110.

The perception system 114 can be configured to perform a perception subtask with respect to autonomous navigation, such as object detection, object classification, object tracking, freespace estimation task, lane detection task, or SLAM task or other suitable subtask. In an embodiment, the perception system 114 can be or include a deep neural network (DNN). The virtual driving simulation system 112 can perform simulated driving maneuvers based on output of the perception system 114. Thus, the virtual driving simulation system 112 can simulate the operation of the AV based on the outcome of the perception subtask performed by the perception system 114 based on the simulated sensor data 108. Simulations for differing combinations of radar parameter settings 110 for each state can be performed. Further, the simulations can be scored based on the performance, number of critical safety events (e.g., collisions, near collisions, etc.), and so forth. For example, the training system 116 can learn matrices of weights to assign to nodes of a DNN (e.g., the computer implemented model 118) to output an optimal radar parameter setting for an identified state; however, the claimed subject matter is not limited to the computer-implemented model 118 being a DNN. Once trained, the computer-implemented model 118 can be utilized to output optical radar parameter settings based on state information from sensor data inputted thereto.

The technologies described herein exhibit various technical advantages over conventional approaches for controlling operation of a sensor system (e.g., a radar system). Rather than using static radar parameter settings over time as is common in conventional approaches, the techniques herein allow for using different radar parameter settings that may be optimal in different states, e.g., environmental conditions or weather, or based on the type, location and distance of objects around the AV. The computer-implemented model 118 can be trained by the training system 116 to identify which radar parameter settings are optimal for each state. The computer-implemented model 118 can be trained off-line via simulation, and once trained the computer-implemented model 118 can be installed on an AV. Accordingly, current sensor data can be used to determine in real-time the optimal radar parameter settings to use for the radar system on the AV.

Figure 2:
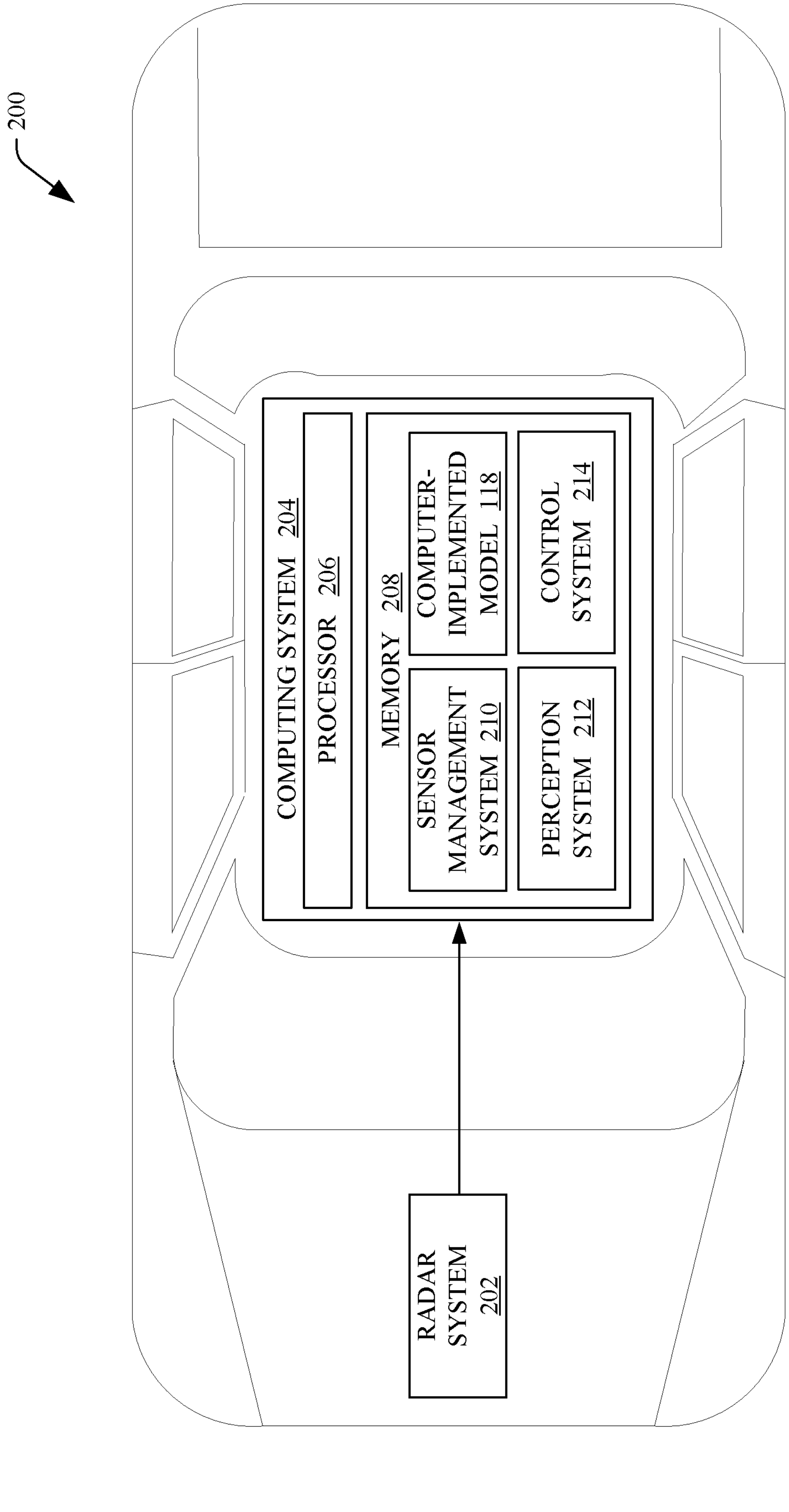
FIG. 2 is a schematic that illustrates an exemplary AV that includes a radar system and a computing system that utilizes a trained computer-implemented model for identifying a radar parameter setting for the radar system.

Referring now to FIG. 2, an AV 200 is illustrated. The AV 200 can be a level 5 fully autonomous AV. While illustrated as an automobile, it is to be understood that the AV 200 may be a truck, a motorcycle, a drone, or other suitable AV. The AV 200 includes a radar system 202. While not illustrated, the AV 200 may further include other sensor systems that output data that can be used in connection with autonomous navigation, such as a camera system, a lidar system, an ultra-sonic sensor system, an infrared sensor system, a global positioning system (GPS), an accelerometer, and/or other suitable sensor systems. The AV 200 further includes a computing system 204 (e.g., a centralized data processing device), where the radar system 202 is configured to transmit data to the computing system 204. Other sensor systems of the AV 200 can similarly be configured to transmit data to the computing system 204. While the radar system 202 is shown as being located at the front of the AV 200, with the computing system 204 being near a center of the AV 200, it is to be understood that the radar system 202 and the computing system 204 may be positioned at any suitable location (or locations) within or upon the AV 200. In another example embodiment, the computing system 204 may be remote from the AV 200 and in communication with other electronic componentry of the AV 200 by way of a high speed connection.

The computing system 204 includes a processor 206 and memory 208, where the memory 208 includes computer-executable instructions that are executed by the processor 206. Pursuant to various examples, the processor 206 can be or include a graphics processing unit (GPU), a plurality of GPUs, a central processing unit (CPU), a plurality of CPUs, an application-specific integrated circuit (ASIC), a digital signal processor (DSP), a microcontroller, a programmable logic controller (PLC), a field programmable gate array (FPGA), or the like.

The memory 208 of the computing system 204 of the AV 200 includes a sensor management system 210 and the computer-implemented model 118 (where the computer-implemented model 118 has been trained in simulation as described above). However, it is contemplated that the computer-implemented model 118 can additionally or alternatively be included in a data store of the computing system 204 of the AV 200. The computer-implemented model 118 trained in simulation is provided to the computing system 204 of the AV 200 (e.g., installed on the computing system 204). Moreover, it is contemplated that the computer-implemented model 118 can be updated over time (e.g., when an updated version of the computer-implemented model 118 is trained it can thereafter be installed on the computing system 204 of the AV 200).

The sensor management system 210 can be configured to control operation of the radar system 202 over time. More particularly, the sensor management system 210 can be configured to modify the radar system 202 to operate using a radar parameter setting identified by the computer-implemented model 118. The computer-implemented model 118 can output the radar parameter setting responsive to a state being inputted to the computer-implemented model 118; accordingly, the sensor management system 210 can utilize the computer-implemented model 118 to determine the radar parameter setting to be employed such that a waveform pattern used by the radar system 202 in a subsequent measurement (e.g., a next measurement) can be adapted based on responses retrieved from a current measurement.

During a first time period, the sensor management system 210 can cause the radar system 202 to operate using a set of radar parameter settings, where the set of radar parameter settings control a waveform pattern of the radar system 202 used to sample an environment nearby the radar system 202 in which the AV 200 is operating. The radar system 202 can generate first sensor data during the first time period. The first sensor data can be transmitted from the radar system 202 to the computing system 204; thus, the computing system 204 can receive the first sensor data. Moreover, a state associated with the first sensor data can be identified by the computing system 204. The state associated with the first sensor data can be indicative of environmental conditions, objects nearby the AV 200, or the like detected from the first sensor data. Accordingly, the state can be identified based on what the radar system 202 is able to measure in the environment in which the AV 200 is operating when using the set of radar parameter settings. The state can be provided as input to the computer-implemented model 118. Based on the state, the computer-implemented model 118 can output an optimal radar parameter setting (or optimal radar parameter settings) (e.g., amplitude, signal waveform, beamsteering settings, phase offsets, etc.) for the radar system 202 to utilize for a subsequent measurement to be performed during a second time period. The sensor management system 210 can send an instruction to the radar system 202 to modify radar system 202 to operate using the radar parameter setting identified by the computer-implemented model 118. Accordingly, the sensor management system 210 can adjust the radar parameter setting(s). Thus, the radar system 202 can generate second sensor data during a second time period when the radar system 202 is operating using the radar parameter setting identified by the computer-implemented model 118. The second sensor data can be transmitted from the radar system 202 and received by the computing system 204. Based on second sensor data received from the radar system 202, the computing system 204 can control the AV 200 to perform a driving maneuvers. In an embodiment, the optimal radar parameter settings can be different for each antenna of a multi-antenna radar system.

According to an example, the first sensor data (e.g., in the form of a point cloud, in the form of raw radar data, in the form of compressed radar data, etc.) generated by the radar system 202 can be inputted to the computer-implemented model 118 (or a differing computer-implemented model). For instance, a convolutional neural network (CNN) can classify the first sensor data to determine the state of the first sensor data.

It is to be appreciated that the radar parameter settings used by the radar system 202 can continue to be adjusted over time. For instance, a state associated with the second sensor data generated during the second time period can be identified and inputted to the computer-implemented model 118. In response, a radar parameter setting can be outputted by the computer-implemented model 118. Thus, the sensor management system 210 can modify the radar system 202 to operate using the radar parameter setting during a third time period.

The memory 208 of the AV 200 can further include a perception system 212 and a control system 214. The perception system 212 (e.g., the perception system 114 of FIG. 1) can be configured to perceive objects nearby the AV 202 (e.g., based on sensor data outputted by the radar system 202 as well as other sensor system(s) of the AV 200). For instance, the perception system 212 can detect, classify, and predict behaviors of objects nearby the AV 200. The perception system 212 (and/or differing system(s) included in the memory 208) can track the objects nearby the AV 200 and/or make predictions with respect to the environment in which the AV 200 is operating (e.g., predict the behaviors of the objects nearby the AV 200). Thus, the perception system 212 can perform autonomous navigation perception subtask(s) based upon the subsequent radar data received from radar system 202 after the radar parameter settings have been modified. Moreover, the control system 214 can be configured to control at least one mechanical system of the AV 200 (such as a steering system, a braking system, and/or a propulsion system) such that the AV 200 performs a driving maneuver.

The radar system 202 may be any suitable type of radar system, such as a continuous wave (CW) radar system (including a frequency modulated continuous wave (FMCW) radar system phase modulated continuous wave (PMCW) or an unmodulated CW radar system) or a pulsed radar system. Further, the computer-implemented model 118 can be any suitable type of machine learning model, such as a DNN, a convolutional neural network, a recurrent neural network, a decision tree, etc.

It is also to be appreciated that while reference herein is made to domain adaptation being performed on radar data generated by a radar system, the same principles apply to sensor data generated by lidar systems, camera systems, or other sensor systems where domain gaps may be problematic.

Figure 3:
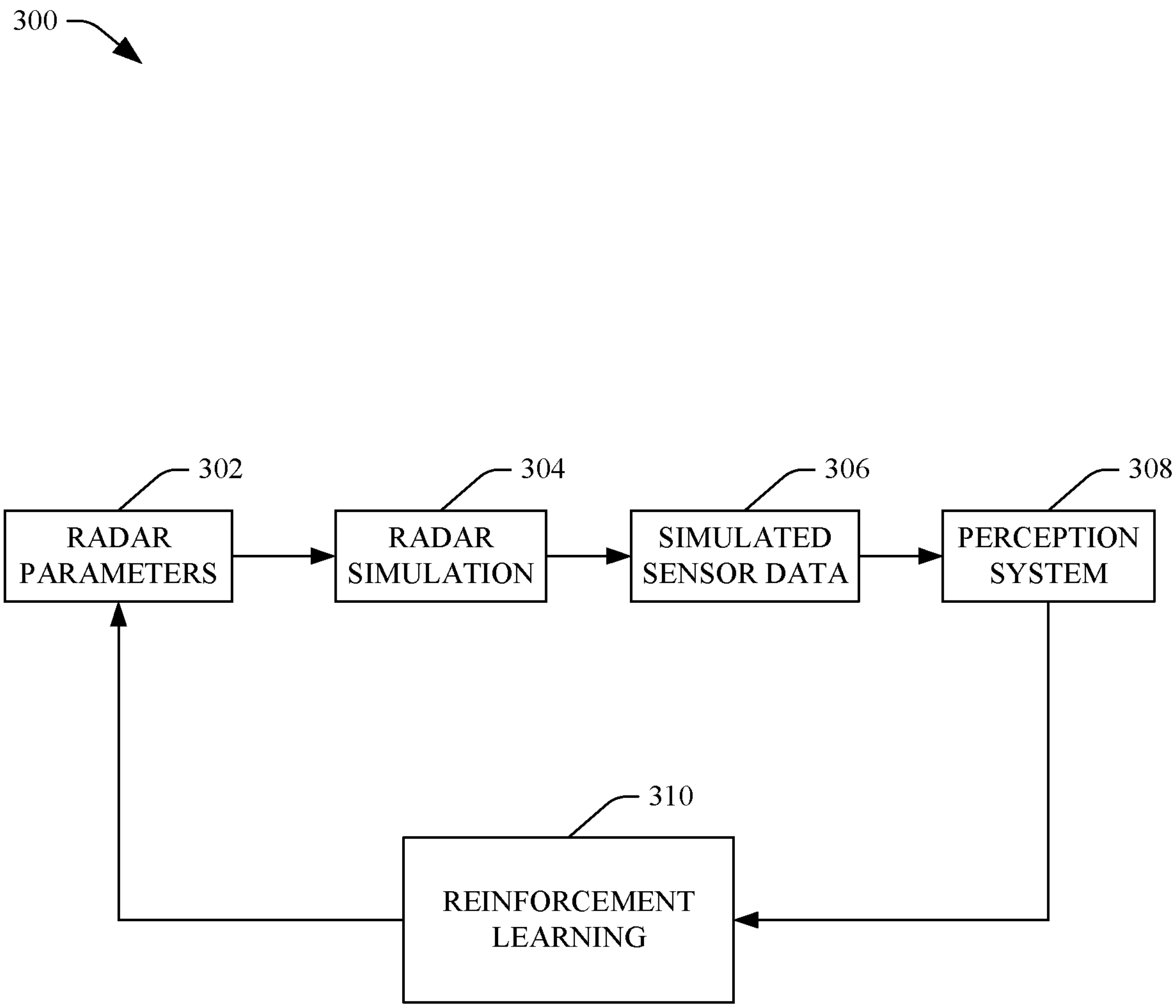
FIG. 3 is a flow diagram illustrating an exemplary methodology for identifying optimal radar parameter setting for associated states based on simulated sensor data.

Turning now to FIG. 3, illustrated is a flow diagram of an exemplary methodology for identifying optimal radar parameter settings for associated states based on simulated sensor data.

The process described in FIG. 3 can be performed offline, in the cloud, or a computing device not connected to an AV. For a starting point, for a given state (e.g., environmental context, locational context, nearby object location/type etc.), the method can start at 302 where radar parameters (e.g., radar parameter settings) are selected and at 304, radar data is simulated to correspond to a radar system using the selected radar parameters. The resulting simulated sensor data 306 are then input into a perception system 308 that performs various AV perception subtasks, (e.g., object detection, object classification, object tracking, freespace estimation task, lane detection task, SLAM task, etc.). Simulated driving operations are performed based on the outputs of the perception system 308. The process through 302,304, 306, and 308 can be rerun for a plurality of runs for a variety of combinations of radar parameter settings. Once completed, an updated computer-implemented model (e.g., the computer-implemented model 118) can be trained via reinforcement learning 310. The number of safety events, critical events and general performance can be scored for each output of the perception system 308, and via reinforcement learning, this computer-implemented model can identify the radar parameters settings that are optimal for each given state, where optimal radar parameter settings are those that result in the highest score, or lowest number of safety/critical events. The process can be an iterative process, where subsequent selections of radar parameter settings can be made at 302 based on the output of the reinforcement learning 310.

Figure 4:
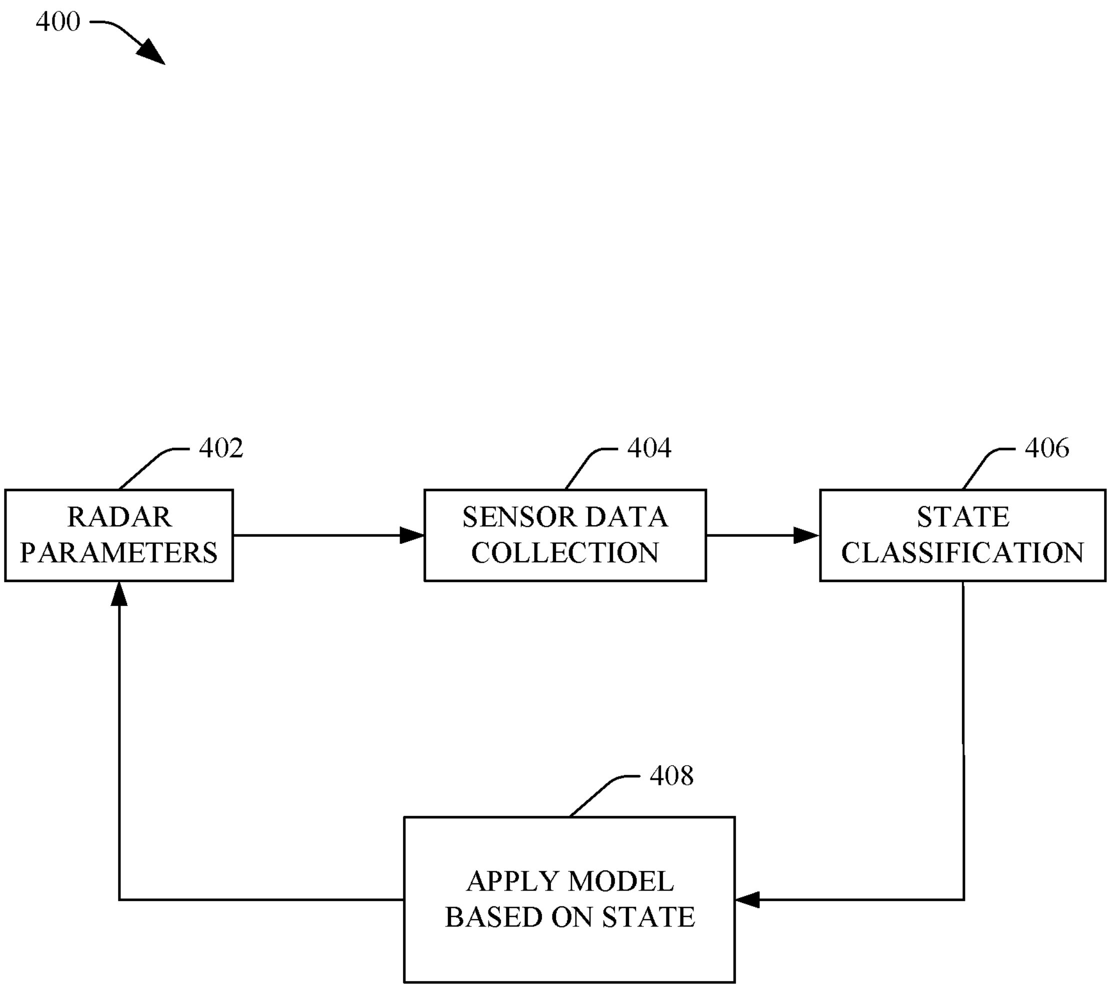
FIG. 4 is a flow diagram illustrating an exemplary methodology for selecting radar parameter settings based on identified state.

FIG. 4 illustrates is a flow diagram of an exemplary methodology for selecting radar parameter settings based on identified state.

At 402, the radar system of an AV has an initial set of radar parameters, and at 404, the radar system can collect sensor data that represents the state of the vehicle. The sensor data can include not just the radar data, but also data from other sensors can collect information related to temperature, moisture/humidity, air pressure, windspeed, current vehicle speed, and etc.

At 406, the state of the AV can be classified via a CNN, and using the state information, at 408 the second computer-implemented model 118 can identify the radar parameter settings based on the state, once implemented, the radar system can collect subsequent radar data which can be used in operation of the AV.

Figure 5:
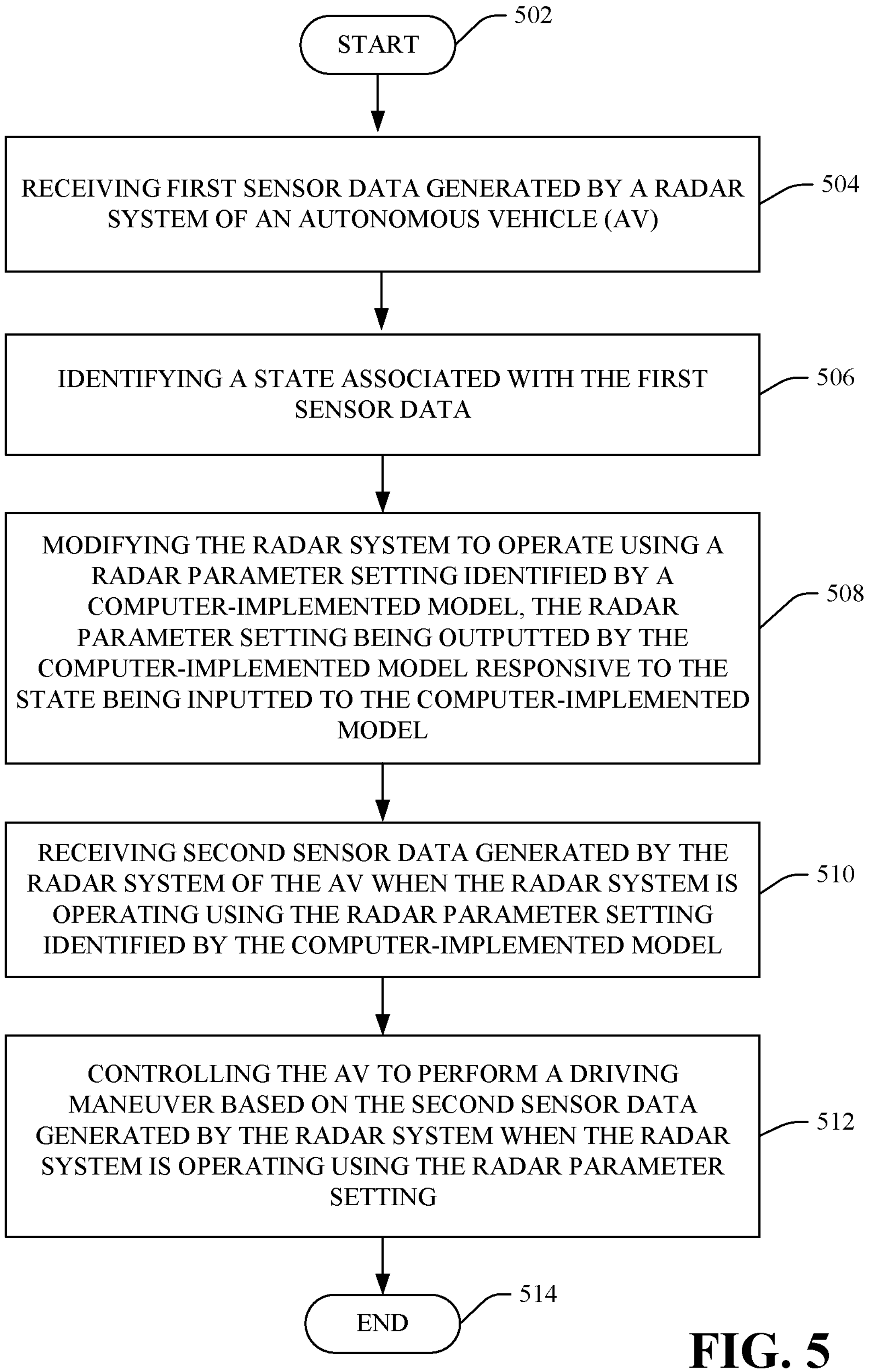
FIG. 5 is a flow diagram illustrating an exemplary methodology for training a computer-implemented model that is configured for use in an AV.

FIG. 5 illustrates an exemplary methodology 500 for controlling a radar system using a computer-implemented model that is configured for use in an AV. While the methodology 500 is shown as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium displayed on a display device, and/or the like.

The methodology 500 starts at 502, and at 504 the step include receiving first sensor data generated by a radar system of an autonomous vehicle (AV). The first set of radar data can be generated by a first radar system mounted on an AV.

At 506, a state associated with the first sensor data is identified. The state (e.g., environmental factors, types of objects around the AV, location of the AV, etc.) can be classified by a CNN that processes radar data and based on a sensor data from other environmental sensors. For instance, the first sensor data can be inputted to the CNN; responsive to the first sensor data being inputted to the CNN, the state associated with the first sensor data can be outputted by the CNN.

At 508, the radar system is modified to operate using a radar parameter setting identified by a computer-implemented model. The radar parameter setting is outputted by the computer-implemented model responsive to the state being inputted to the computer-implemented model. Moreover, the computer-implemented model is trained based on simulation sensor data that satisfies a goal function generated from virtual driving simulation in a virtual environment.

At 510, second sensor data generated by the radar system of the AV is received when the radar system is operating using the radar parameter setting identified by the computer-implemented model.

At 512, the AV is controlled to perform a driving maneuver based on the second sensor data generated by the radar system when the radar system is operating using the radar parameter setting. The methodology 500 completes at 514.

Figure 6:
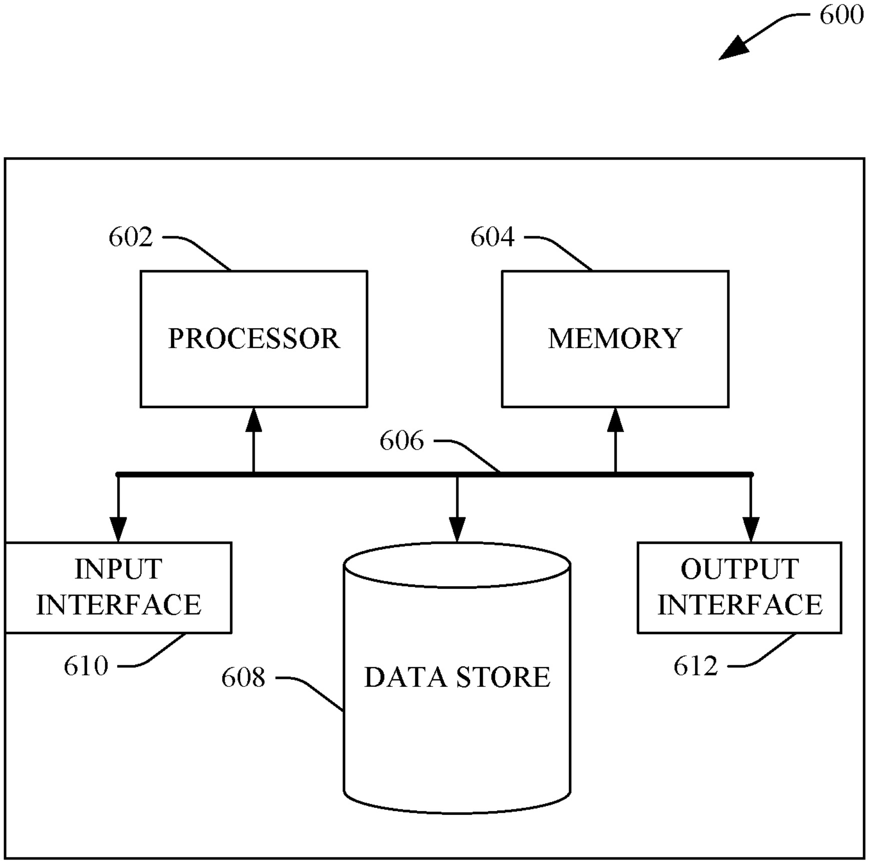
FIG. 6 is an example computing system.

Referring now to FIG. 6, a high-level illustration of a computing device 600 that can be used in accordance with the systems and methodologies disclosed herein is illustrated. For instance, the computing device 600 may be used in a system that is configured to perform a driving maneuver based upon outputs of a computer-implemented model installed on the computing device 600. By way of another example, the computing device 600 can be used in a system that is configured to compute correction factors to use when correcting an image. The computing device 600 includes at least processor 602 that executes instructions that are stored in a memory 604. The instructions may be, for instance, instructions for implementing functionality described as being carried out by one or more components discussed above or instructions for implementing one or more of the methods described above. The processor 602 may access the memory 604 by way of a system bus 606. In addition to storing executable instructions, the memory 604 may also store radar data, images, etc.

The computing device 600 additionally includes a data store 608 that is accessible by the processor 602 by way of the system bus 606. The data store 608 may include executable instructions, images, raw sensor data, etc. The computing device 600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc. by way of the output interface 612.

Additionally, while illustrated as a single system, it is to be understood that the computing device 600 may be a distributed system. Thus, for instance, several devices may be in communication by way of a network connection and may collectively perform tasks described as being performed by the computing device 600.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The features described herein relate to a computer architecture in a vehicle according to at least the examples provided below.

(A1) In one aspect, a computing system of a vehicle is provided that includes a processor and memory that stores instructions that when executed by the processor cause the processor to perform acts. The acts can include receiving first sensor data generated by a radar system of the vehicle. The acts can also include identifying a state associated with the first sensor data. The acts can also include modifying the radar system to operate using a radar parameter setting identified by a computer-implemented model, the radar parameter setting being outputted by the computer-implemented model responsive to the state being inputted to the computer-implemented model, wherein the computer-implemented model is trained based on simulation sensor data that satisfies a goal function generated from virtual driving simulation in a virtual environment. The acts can also include receiving second sensor data generated by the radar system of the vehicle when the radar system is operating using the radar parameter setting identified by the computer-implemented model. The acts can also include controlling the vehicle to perform a driving maneuver based on the second sensor data generated by the radar system when the radar system is operating using the radar parameter setting.

(A2) In some embodiments of the computing system of A1, the state is identified via a convolutional neural network, wherein the state is outputted by the convolution neural network responsive to the first sensor data being inputted to the convolution neural network.

(A3) In some embodiments of the computing system of A1-A2, the radar parameter setting is at least one of an amplitude setting, beamsteering setting, signal waveform setting, and phase offset setting.

(A4) In some embodiments of the computing system of A1-A3, the acts also include modifying respective radar parameter settings for each antenna of a multi-antenna radar system.

(A5) In some embodiments of the computing system of A1-A4, the radar parameter setting is determined based on iteratively simulating a set of radar parameter settings and selecting the radar parameter setting that results in an optimal score associated with the goal function.

(A6) In some embodiments of the computing system of A5, the acts also include performing a simulated driving maneuver based on an output of the perception stack associated with each radar parameter setting of the set of radar parameter settings.

(A7) In some embodiments of the computing system of A1-A6, the computer-implemented model is trained using reinforcement learning in simulation (A8) In some embodiments of the computing system of A1-A7, the acts also include performing a perception subtask based on the second sensor data utilizing a perception system, wherein the perception subtask comprises at least one of an object detection task, a freespace estimation task, a lane detection task, and a SLAM task, and wherein the vehicle is controlled to perform the driving maneuver based on output of the perception subtask.

(B1) In one aspect, a method can include receiving first sensor data generated by a radar system of a vehicle. The method can also include identifying a state associated with the first sensor data. The method can also include modifying the radar system to operate using a radar parameter setting identified by a computer-implemented model, the radar parameter setting being outputted by the computer-implemented model responsive to the state being inputted to the computer-implemented model, wherein the computer-implemented model is trained based on simulation sensor data that satisfies a goal function generated from virtual driving simulation in a virtual environment. The method can also include receiving second sensor data generated by the radar system of the vehicle when the radar system is operating using the radar parameter setting identified by the computer-implemented model. The method can also include controlling the vehicle to perform a driving maneuver based on the second sensor data generated by the radar system when the radar system is operating using the radar parameter setting (B2) In some embodiments of the method of B1, the identifying the state is via a convolutional neural network, wherein the state is outputted by the convolution neural network responsive to the first sensor data being inputted to the convolution neural network.

(B3) In some embodiments of the method of B1-B2, wherein the radar parameter setting is at least one of an amplitude setting, beamsteering setting, signal waveform setting, and phase offset setting.

(B4) In some embodiments of the method of B1-B3, the method also includes modifying respective radar parameter settings for each antenna of a multi-antenna radar system.

(B5) In some embodiments of the method of B1-B4, the method also includes iteratively simulating a set of radar parameter settings and selecting the radar parameter setting that results in an optimal score associated with the goal function.

(B6) In some embodiments of the method of B1-B5, the method also includes performing a perception subtask based on the second sensor data utilizing a perception system, wherein the perception subtask comprises at least one of an object detection task, a freespace estimation task, a lane detection task, and a SLAM task, and wherein the vehicle is controlled to perform the driving maneuver based on output of the perception subtask based on the simulation sensor data generated based on the set of radar parameter settings.

(B7) In some embodiments of the method of B1-B6, the computer-implemented model is trained using reinforcement learning in simulation.

(C1) In one aspect, a computer-readable storage medium is provided that includes instructions that, when executed by a processor, cause the processor to perform acts. The acts can include receiving first sensor data generated by a radar system of a vehicle. The acts can also include identifying a state associated with the first sensor data. The acts can also include modifying the radar system to operate using a radar parameter setting identified by a computer-implemented model, the radar parameter setting being outputted by the computer-implemented model responsive to the state being inputted to the computer-implemented model, wherein the computer-implemented model is trained based on simulation sensor data that satisfies a goal function generated from virtual driving simulation in a virtual environment. The acts can also include receiving second sensor data generated by the radar system of the vehicle when the radar system is operating using the radar parameter setting identified by the computer-implemented model. The acts can also include controlling the vehicle to perform a driving maneuver based on the second sensor data generated by the radar system when the radar system is operating using the radar parameter setting.

(C2) In some of the embodiments of the computer-readable storage medium of C1, the state is identified via a convolutional neural network, wherein the state is outputted by the convolution neural network responsive to the first sensor data being inputted to the convolution neural network.

(C3) In some of the embodiments of the computer-readable storage medium of C1-C2, the radar parameter setting is at least one of an amplitude setting, beamsteering setting, signal waveform setting, and phase offset setting.

(C4) In some of the embodiments of the computer-readable storage medium of C1-C3, the acts also include modifying respective radar parameter settings for each antenna of a multi-antenna radar system.

(C5) In some of the embodiments of the computer-readable storage medium of C1-C4, the radar parameter setting is determined based on iteratively simulating a set of radar parameter settings and selecting the radar parameter setting that results in an optimal score associated with the goal function.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing system of a vehicle, comprising:

a processor; and memory that stores instructions that, when executed by the processor, cause the processor to perform acts comprising:

receiving first sensor data generated by a radar system of the vehicle when using an initial radar parameter setting;

identifying a state associated with the first sensor data, wherein the state comprises a classification of the ambient environment in which the radar system is operating, and wherein the state is identified based on what the radar system is able to measure in the ambient environment in which the vehicle is operating when using the initial radar parameter setting;

modifying the radar system to operate using a radar parameter setting outputted by a computer-implemented model, the radar parameter defining operational characteristics for the radar system for a subsequent measurement by the radar system, the operational characteristics comprising at least one of an amplitude setting, a beamsteering setting, a signal waveform setting, or a phase offset setting, the radar parameter setting being outputted by the computer-implemented model responsive to the state being inputted to the computer-implemented model, wherein the computer-implemented model is trained based on simulation sensor data that satisfies a goal function generated from virtual driving simulation in a virtual environment by:

iteratively performing a simulated driving maneuver based on an output of a perception system of the vehicle that processes the simulation sensor data for a set of different radar parameter settings; and scoring an outcome of the simulated driving maneuver against the goal function based on navigation accuracy and avoidance of safety events to generate a quantitative performance score for each respective radar parameter setting of the set of different radar parameter settings to select a radar parameter setting based on the quantitative performance scores, wherein the quantitative performance score provides a feedback signal for training the computer-implemented model to learn matrices of weights to output an optimized radar parameter setting for the state;

receiving second sensor data generated by the radar system of the vehicle when the radar system is operating using the radar parameter setting outputted by the computer-implemented model; and controlling the vehicle to perform a driving maneuver based on the second sensor data generated by the radar system when the radar system is operating using the radar parameter setting.

2. The computing system of claim 1, wherein the state is identified via a convolutional neural network, wherein the state is outputted by the convolution neural network responsive to the first sensor data being inputted to the convolutional neural network.

3. The computing system of claim 1, wherein the acts further comprise: modifying respective radar parameter settings for each antenna of a multi-antenna radar system.

4. The computing system of claim 1, wherein the computer-implemented model is trained using reinforcement learning in simulation.

5. The computing system of claim 1, wherein the acts further comprise:

performing a perception subtask based on the second sensor data utilizing the perception system, wherein the perception subtask comprises at least one of an object detection task, a freespace estimation task, a lane detection task, and a SLAM task, and wherein the vehicle is controlled to perform the driving maneuver based on output of the perception subtask.

6. A method, comprising:

receiving first sensor data generated by a radar system of a vehicle when using an initial radar parameter setting;

identifying a state associated with the first sensor data, wherein the state comprises a classification of the ambient environment in which the radar system is operating, and wherein the state is identified based on what the radar system is able to measure in the ambient environment in which the vehicle is operating when using the initial radar parameter setting;

modifying the radar system to operate using a radar parameter setting outputted by a computer-implemented model, the radar parameter defining operational characteristics for the radar system for a subsequent measurement by the radar system, the operational characteristics comprising at least one of an amplitude setting, a beamsteering setting, a signal waveform setting, or a phase offset setting, the radar parameter setting being outputted by the computer-implemented model responsive to the state being inputted to the computer-implemented model, wherein the computer-implemented model is trained based on simulation sensor data that satisfies a goal function generated from virtual driving simulation in a virtual environment by:

iteratively performing a simulated driving maneuver based on an output of a perception system of the vehicle that processes the simulation sensor data for a set of different radar parameter settings; and scoring an outcome of the simulated driving maneuver against the goal function based on navigation accuracy and avoidance of safety events to generate a quantitative performance score for each respective radar parameter setting of the set of different radar parameter settings to select a radar parameter setting based on the quantitative performance scores, wherein the quantitative performance score provides a feedback signal for training the computer-implemented model to learn matrices of weights to output an optimized radar parameter setting for the state;

receiving second sensor data generated by the radar system of the vehicle when the radar system is operating using the radar parameter setting outputted by the computer-implemented model; and controlling the vehicle to perform a driving maneuver based on the second sensor data generated by the radar system when the radar system is operating using the radar parameter setting.

7. The method of claim 6, wherein the identifying the state is via a convolutional neural network, wherein the state is outputted by the convolution neural network responsive to the first sensor data being inputted to the convolutional neural network.

8. The method of claim 6, further comprising:

modifying respective radar parameter settings for each antenna of a multi-antenna radar system.

9. The method of claim 6, further comprising:

performing a perception subtask based on the second sensor data utilizing the perception system, wherein the perception subtask comprises at least one of an object detection task, a freespace estimation task, a lane detection task, and a SLAM task, and wherein the vehicle is controlled to perform the driving maneuver based on output of the perception subtask based on the simulation sensor data generated based on the set of radar parameter settings.

10. The method of claim 6, wherein the computer-implemented model is trained using reinforcement learning in simulation.

11. A computer-readable storage medium comprising instructions that, when executed by a processor, cause the processor to perform acts, the acts comprising:

receiving first sensor data generated by a radar system of a vehicle when using an initial radar parameter setting;

identifying a state associated with the first sensor data, wherein the state comprises a classification of the ambient environment in which the radar system is operating, and wherein the state is identified based on what the radar system is able to measure in the ambient environment in which the vehicle is operating when using the initial radar parameter setting;

modifying the radar system to operate using a radar parameter setting outputted by a computer-implemented model, the radar parameter defining operational characteristics for the radar system for a subsequent measurement by the radar system, the operational characteristics comprising at least one of an amplitude setting, a beamsteering setting, a signal waveform setting, or a phase offset setting, the radar parameter setting being outputted by the computer-implemented model responsive to the state being inputted to the computer-implemented model, wherein the computer-implemented model is trained based on simulation sensor data that satisfies a goal function generated from virtual driving simulation in a virtual environment by:

iteratively performing a simulated driving maneuver based on an output of a perception system of the vehicle that processes the simulation sensor data for a set of different radar parameter settings; and scoring an outcome of the simulated driving maneuver against the goal function based on navigation accuracy and avoidance of safety events to generate a quantitative performance score for each respective radar parameter setting of the set of different radar parameter settings to select a radar parameter setting based on the quantitative performance scores, wherein the quantitative performance score provides a feedback signal for training the computer-implemented model to learn matrices of weights to output an optimized radar parameter setting for the state;

receiving second sensor data generated by the radar system of the vehicle when the radar system is operating using the radar parameter setting outputted by the computer-implemented model; and controlling the vehicle to perform a driving maneuver based on the second sensor data generated by the radar system when the radar system is operating using the radar parameter setting.

12. The computer-readable storage medium of claim 11, wherein the state is identified via a convolutional neural network, wherein the state is outputted by the convolution neural network responsive to the first sensor data being inputted to the convolutional neural network.

13. The computer-readable storage medium of claim 11, wherein the acts further comprise:

modifying respective radar parameter settings for each antenna of a multi-antenna radar system.

* * * * *